EXPLODED COARSE FIBER MATERIAL

THIN OUT FIBER BUNDLES
(CSF - 600 - 700)

DELIGNIFY BY CHLORINATION

BLEACH

REFINE TO DESIRED CSF

FORM TO SHEET PRODUCT

FIG. 3

United States Patent Office 3,707,436
Patented Dec. 26, 1972

3,707,436
EXPLODING OF AMMONIA IMPREGNATED WOOD CHIPS
James J. O'Connor, Appleton, Wis., assignor to Kimberly-Clark Corporation, Neenah, Wis.
Continuation-in-part of abandoned application Ser. No. 641,858, May 29, 1967. This application Mar. 22, 1971, Ser. No. 126,629
Int. Cl. D21c 9/00
U.S. Cl. 162—9
16 Claims

ABSTRACT OF THE DISCLOSURE

A process of manufacturing pulp including the steps of impregnating a mass of lignocellulosic chips with anhydrous ammonia, heating, without added steam, the impregnated chips within a closed space under pressure and suddenly releasing the pressure to cause ejection of the impregnated chips from the space and explosive removal of ammonia with accompanying deformation and disintegration of the chips to a fibrous condition in which the fibers are flexible, kinked, twisted and curled. The fibers are of a relatively light color, unfibrillated, contain substantially all of the cellulose, hemicellulose and lignin of the original material, are readily delignified and are bleachable to a high brightness.

---

This application is a continuation-in-part of my copending application Ser. No. 641,858 filed May 29, 1967, now abandoned and assigned to the same assignee as the present application.

FIELD OF THE INVENTION

This invention relates to the production of lignocellulosic fibrous materials which exhibit a combination of novel properties and characteristics exemplified in a wide variety of products.

BACKGROUND OF THE INVENTION

It is well known that nitrogenous agents such as ammonia and amine-nitrogen compounds have an —$NH_2$ group, for example, are effective to swell and plasticize wood. Steam or hot water plus high temperature in combination are also known to have a plasticizing effect on the lignin components of wood. Thus, steam treated wood under considerable pressure and temperature conditions has been subject to sudden pressure release to, in effect, explode the wood into a fibrous condition. Such action requires a relatively high steam temperature to secure the necessary degree of plasticization of the wood, and the fibrous product even then is of a quality useful only in paper board manufacture and the like. Such fiber is not only very coarse but the high temperature involved, together with the aqueous and generally acidic nature of the system, has led to fiber embrittlement and fiber discoloration. The lignin, when exposed to acid conditions, undergoes condensation reactions making it difficult to bleach and also difficult to remove by conventional delignification methods. It has been found that the embrittlement may be reduced to some extent by including in the aqueous system some alkali which tends to reduce the quantity of acid present and consequently the acid attack on the fiber. The alkali, however, in such steam explosion procedures results in further discoloration and darkening of the fiber, making it very difficult to bleach and the procedure is, therefore, not believed at all practical for the production of papermaking fibers. The acid present is to some extent naturally occurring in the wood. But the combination of high temperature and aqueous system apparently causes hydrolytic cleavage of polysaccharides bonded by acetal linkages, thereby producing more acid components and also reducing the average molecular weight of the cellulose. Additionally, the aqueous system apparently removes substantial quantities of the hemicelluloses which are commonly desirable in papermaking pulps (other than the low bonding alpha pulps where the hemicelluloses are deliberately removed by pretreatment of wood with heated water). To minimize some of the adverse effects of high steam temperature, attempts are made to critically control the time of exposure of the wood to the various steam atmospheres; such is only partially successful, involves accurate and expensive control equipment and, commonly the product is not such that it may be made suitable for papermaking as contrasted with insulating board and hardboard production.

DISCUSSION OF THE INVENTION

I have found that the plasticizing effect of the nitrogenous swelling agents for wood may be beneficially employed with other procedures in an explosion wood defibering process by utilizing such of those agents as exhibit a relatively high vapor pressure and by simultaneously severely limiting the water content of the system. In the preferred practice of my process the nitrogenous agent itself is most suitably anhydrous, no water is specifically added to the system, and the agent, while it may be gaseous, is preferably supplied as a liquid. For the attainment of specific purposes, as set out hereinafter, the water content may be limited by subjection the wood itself to a drying or partial drying. Thus, the water content of the starting material is suitably between 0 and 100% based on the oven dry weight of the material.

Importantly, the liquid nitrogenous agents such as ammonia and the lower aliphatic amines not only swell and plasticize the wood to provide a useful condition for the explosion procedure, but the mechanism involved leads to quite different results than occurs with a combination of steam and temperature plasticization. Specifically and in one aspect, the nitrogen swelling agent appears to have a minimal alkali effect and darkening of the pulped wood is also minimal. Additionally, the hemicelluloses are not rendered water soluble in any significant quantity and are, therefore, available for fiber bonding after pulp washing and refining or other pulping action. Also, the acetal linkages of the polysaccharides are apparently not affected and there is not significant cellulose chain scission reducing cellulose molecular weight. And most importantly, the lignin portion of the lignocellulose material is not rendered refractory to bleach solutions as appears to be the case with the steam-water-temperature type of procedure; consequently, the fiber product may be provided at a reasonable brightness value for many purposes with only a minimum of cost.

The product of the wood ammonolysis by explosion is a fibrous material having only a minimum of water solubles removable by washing with water and acids. This minimum removable water solubles is basically the natural water soluble content of the wood which commonly includes acids such as acetic. However, I have found that by reaction of the nitrogenous agent (ammonia) with the cellulose in my process the acetyls and some esters are largely converted to amides and recoverable from the water solubles, particularly as acetamide; other by-products recoverable include vanillic acid and p-hydroxy benzoic acid. Consequently, the actual wood yield may be enhanced by recovery of such saleable material.

In a more specific aspect by my procedure an exploded fibrous material is obtained having a novel combination of characteristics and properties. Thus, the exploded fiber product constituted of fibers and fiber bundles contains in insoluble form the important hemicelluloses (commonly lost from the fibers in steaming procedures) which (a) plasticize the fibers contributing to ease of beating in pulp processing and paper manufacture, and (b) give paper product strength due to high interfiber bonding capability. The retention of these hemicelluloses provides a very high yield material. The fibers of the product are of good length, not fibrillated, and have a relatively good size distribution suiting them for mechanical or chemical pulping procedures and combinations thereof, and are in contrast to groundwood materials which are of short fiber length. The fibers contain substantially all of the lignin of the original lignocellulose but such is not detrimental to bleachability or delignification as the lignin is not chemically condensed to a refractory state as it appears to be by steaming procedures. Rather, the lignin is readily removed when desired by even a simple chlorination procedure, and without damage to the cellulose, the hemicelluloses or fiber length. Further, the fibers are rendered more plastic apparently because the treatment strikes deep into the fiber affecting the cellulose as well as the lignin and rendering the cellulose somewhat more amorphous and thus somewhat more plastic; such plasticity is retained by the product even after the nitrogeneous agent is removed and demonstrates itself particularly in the presence of heat, hot water and the like as in pulping procedures. In fact, gentle fiber separation followed by refining to freenesses of 150 and below to attain a defibered material is readily accomplished. A further factor enhancing the production of pulp from the exploded fiber material is the crinkled, curled and twisted nature of the exploded material. These latter characteristics are retained and assist in the fibrillation by mechanical procedures and are in fact also retained throughout even chemical procedures. The deformation of the individual fibers apparently is due to a high degree of swelling in the nitrogenous agent followed by high shrinkage upon agent removal, and a setting of the fiber structure in the new condition, a setting which is not altered significantly by dispersion in aqueous systems or by re-treatment with ammonia or other nitrogenous swelling agents.

The attainment of the novel characteristics and pulp properties is most satisfactorily achieved by using as the nitrogenous agent ammonia ($NH_3$), and this terminology as used will be understood to include those nitrogenous agents such as the lower aliphatic primary amines which penetrate and alter the crystalline cellulose, reduce the crystallinity and render the fibers more plastic; primary amines of up to about 3 carbon atoms are, for example, useful in a technical sense though for many purposes unsuited economically.

The novel characteristics and properties of the lignocellulose outlined are achieved by exploding chips of the lignocellulose material into the fiber and fiber bundle state. No mechanical working of the chips is necessary. Chips of the hardwoods are most useful and demonstrate most dramatically the differences attained by my procedure over that of prior art approaches; the softwoods are useful and provide improved pulp materials but some features, such as fiber length prevailing in the original wood, are not as completely attained. Thus, some differences will be present due to the nature of the starting material and to the water content of that material. In fact, I have found it to be important, if not critical to fiberizing, to control the ammonia to water ratio; this is conveniently expressed in terms of weight, and the preferred ratio range of ammonia to water by weight is between about 1:1 to about 9:1 and may extend to 20:1 and above. The plasticity of the lignocellulose, as noted, is materially affected by this ammonia to water ratio as well as by the temperature and, of course, the proportion of the lignocellulose material. The water content of the lignocellulose is generally of itself sufficient for the purpose, and addition of water beyond the natural content is not commonly desired though it may, of course, be practiced, usually resulting in the presence, however, of increased water solubles. Similarly, drying of the lignocellulose material prior to explosion is not usually necessary, and completely dry material appears to be less effective.

In somewhat greater detail, my procedure is favored by impregnating the lignocellulose material in the form of small pieces, conveniently termed herein chips, with the swelling agent under pressure in a confined space and at elevated and, if desired, conveniently relatively low temperature. The pressure may be quite high but is not required to be above 1000 p.s.i. and may be much lower. The chips are preferably the usual commercial material commonly employed in pulp procedures for papermaking but may be coarse sawdust, slabs, edgings or the like. The temperature may be low (200° F.–300° F.) relative to steam explosion procedures; the pressure developed by the combination of temperature and volatile agent or agents should be sufficient to provide for rapid ejection of the chips from the confined space through a relatively restricted outlet from the space to a zone of materially lower pressure. Such latter pressure may be, and commonly is, that of the atmosphere. Disintegration of the chips to the fibrous state occurs as the volatile agent released from the pressure condition expands explosively. The ammonia thus functions in conjunction with the elevated temperature condition to plasticize the cellulose throughout, to serve as the explosive agent, to inhibit (with the small quantity of water present) the development of acid conditions, and to largely prevent the development of those alkaline conditions of a nature which would cause excessive darkening of the product and poor bleachability.

The ammonia itself is readily recoverable by collection and condensation procedures and is re-usable in the procedure. However, in addition to some system losses, some ammonia will be taken up in ammonolysis reactions, resulting in amide formation as well as vanillic acid and p-hydroxy benzoic acid formation; such are recoverable upon washing of the exploded product.

The novel characteristics and properties of the novel pulp material appear in paper sheet products derived from the exploded material by mechanical or chemical pulping of the exploded material. Most notable of the sheet characteristics is the high bonding capacity which, in the case of some mechanical pulps, yields a sheet up to about 8 to 10 times the strength of sheets similarly prepared with groundwood; a very high tear strength, high stretch and high tensile energy absorption. Particularly of interest is that the exploded material responds quite differently as to the tear characteristic of the paper products dependent on the sequence of refining and delignification steps applied to the exploded fiber material, as will be noted hereinafter in connection with the detailed examples.

BRIEF DESCRIPTION OF THE DRAWINGS

The invention will be more fully understood by reference to the detailed description including specific examples which follow and the accompanying drawings wherein:

FIG. 3 is a flow chart of the principal process steps involved in one method of production of a chemical pulp utilizing as the source material the fibrous production of the process of FIG. 1;

With respect to the drawings, FIGS. 1 to 4 inclusive are directed to flow charts and will be discussed in connection with the specific examples which follow.

Figure 1:
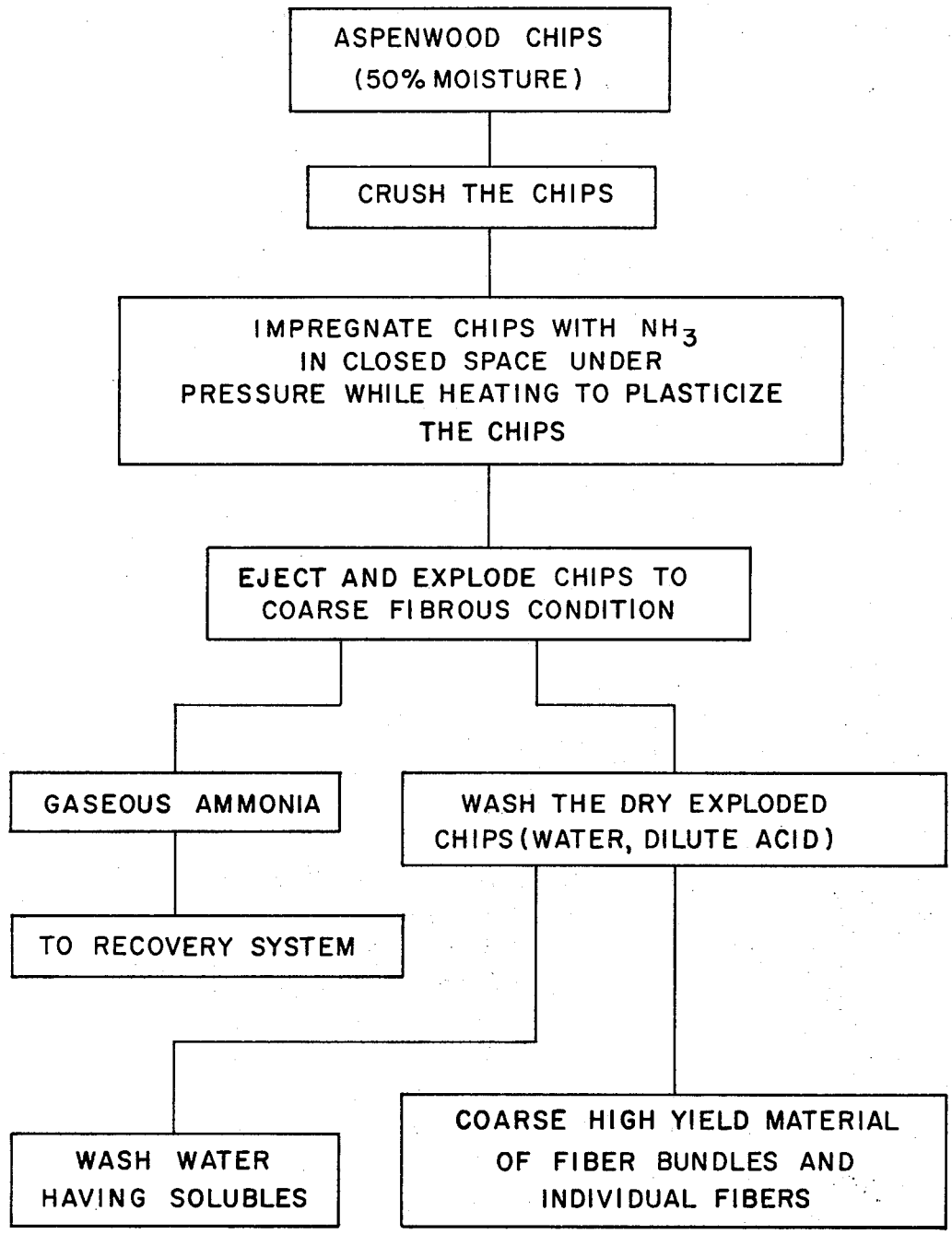
FIG. 1 is a flow chart of procedural steps involved in a preferred embodiment of the basic process for the production of a fibrous material in accordance with the invention.
Figure 2:
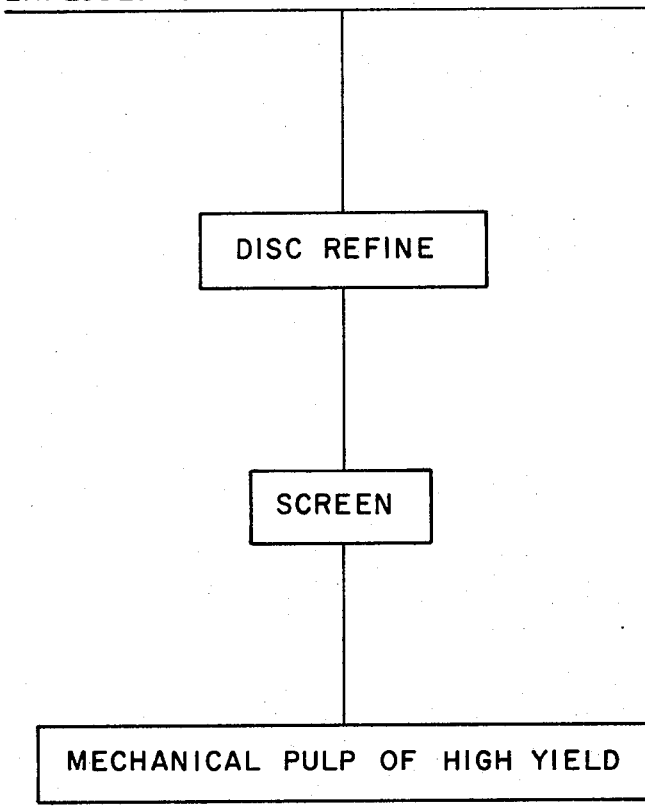
FIG. 2 is a flow chart of procedural steps involved in the production of mechanical pulp utilizing as the source material the fibrous product of the process of FIG. 1.
Figure 4:
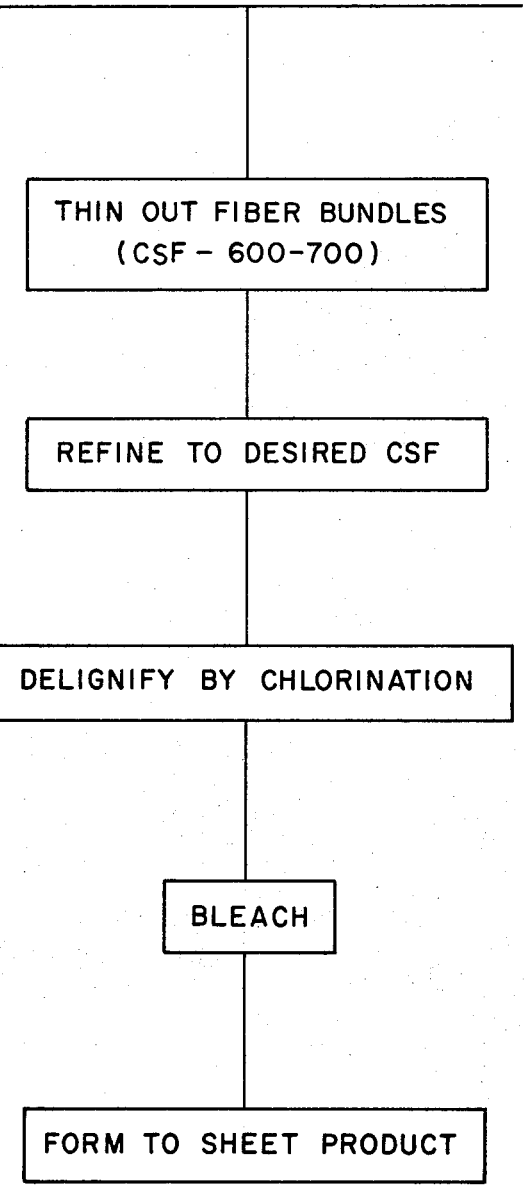
FIG. 4 is a flow chart of the principal process steps of an alternative method of production of a chemical pulp utilizing the fibrous product of the process of FIG. 1 as a source material.
Figure 5:
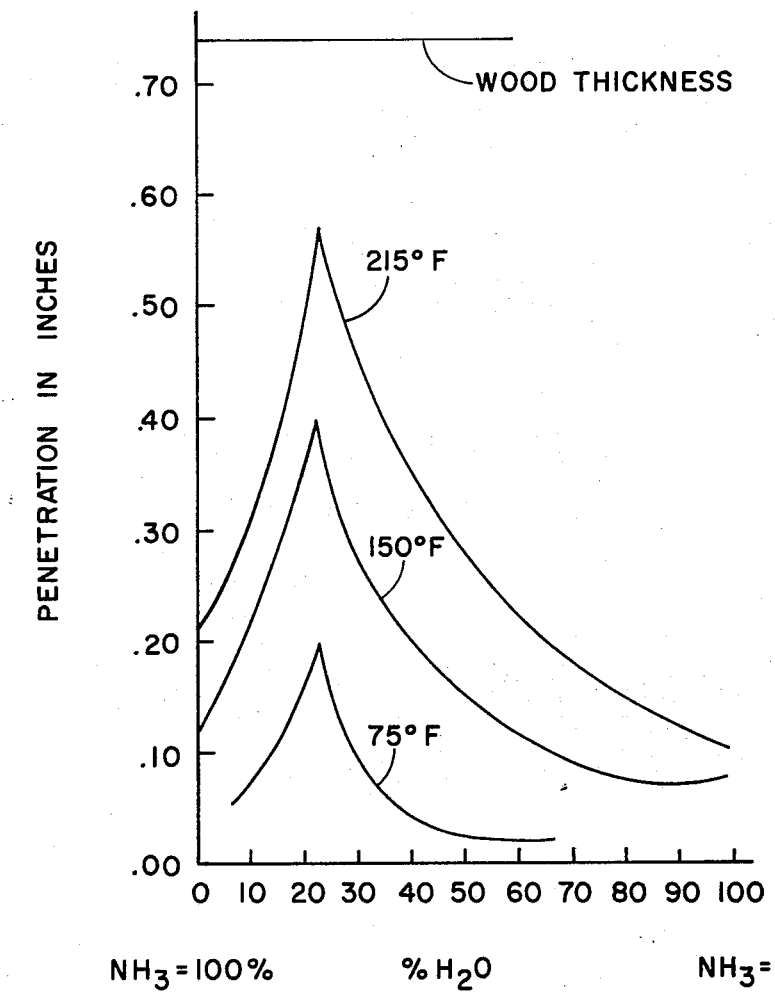
FIG. 5 is a graph illustrating the relationship between wood plasticity as determined by a penetrant object and ammonia-water ratio for hardwoods over a preferred range of temperatures.
Figure 6:
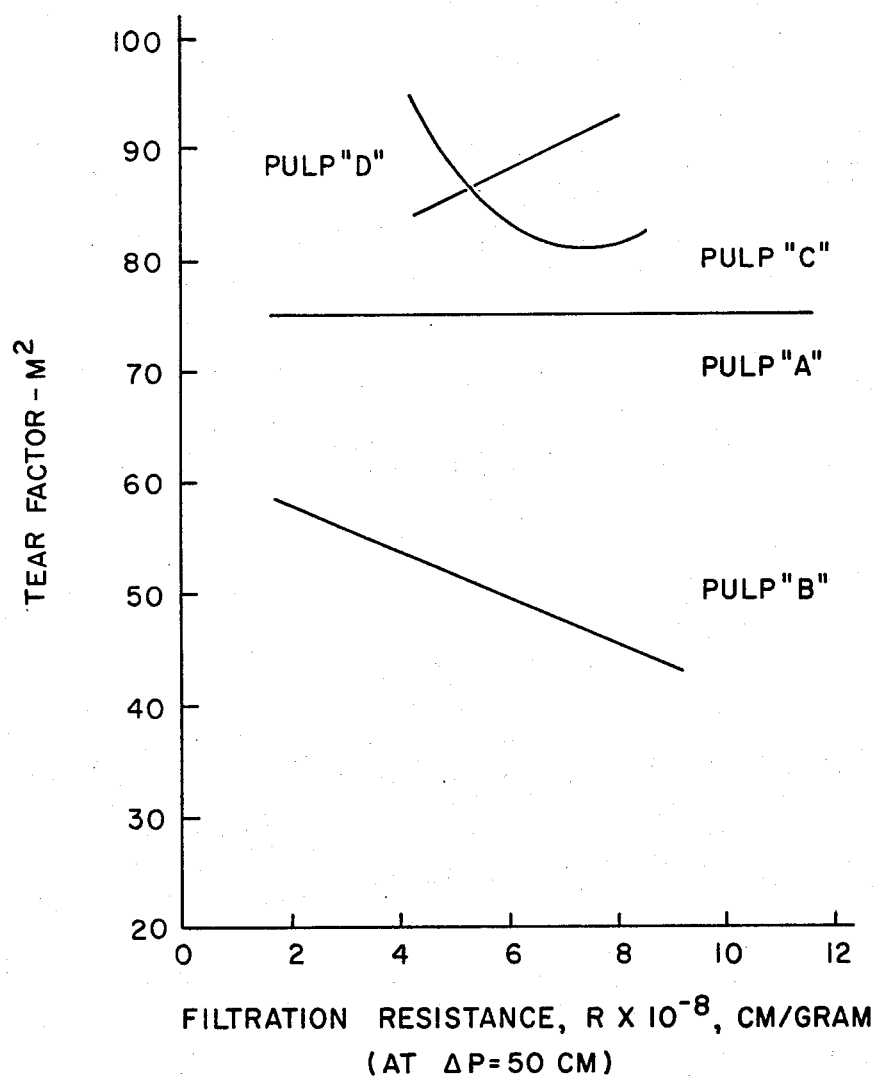
FIG. 6 is a graph of tear factor vs. filtration resistance for a plurality of paper sheets having different pulp sources and particularly illustrating the high tear factor of pulps derived from the product of the process of FIGS. 1, 3 and 4.
Figure 7:
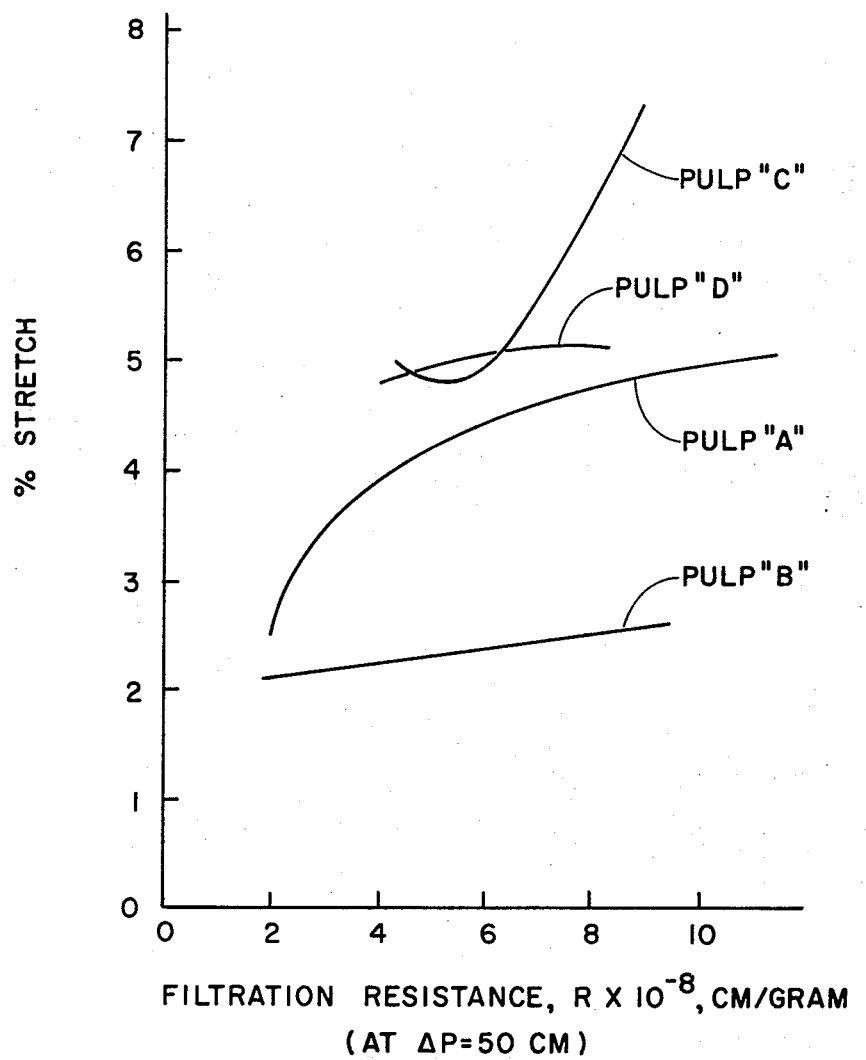
FIG. 7 is a graph similar to that of FIG. 6 but illustrating stretch characteristics rather than tear.

FIGS. 5 to 7 illustrate characteristics of the materials involved in the procedure including those developed from a plurality of wood types in accordance with the following examples.

In FIG. 5 there is illustrated subject matter relating the ammonia-water ratio to wood plasticity as determined by wood penetration tests. For the purpose of determining the plasticity, wood cubes ¾" (aspen) on a side were placed in a holder; the holder retained 4 cubes spaced well apart circumferentially. The holder was heat resistant and placed with the positioned wood cube samples into the impregnation chamber. The cubes were covered with liquid ammonia, the amount of ammonia being just sufficient to cover the cubes. The chamber was then sealed and the tempertaure raised by admitting steam into the jacket surrounding the chamber. In each instance the temperature was raised over a period of about 15 minutes and then maintained at the temperature for about 45 minutes. At the end of this time period a drop weight in the form of a needle having a weight of about 221 grams and a diameter of 3/32 inch was permittted to fall 12⅝ inches. By this means four measurements of plasticity were obtained for each run in the chamber.

As will be noted from FIG. 5, even at the lower end of the temperature range, that is, between about 75° F. and 215° F., the change in plasticity with the ammonia to water ratio was quite significant and also fairly critical. It is to be noted that the very considerable penetration by the needle or drop weight through the sample probably does affect the accuracy to some extent, particularly at the higher temperature were the penetration is about 80% of the thickness of the original samples. FIG. 5 does, however, show that optimum plasticity is attained between about 70 and 85% ammonia based on the total weight of water and ammonia present in the system, that is, about 4:1. The graphs of FIG. 5 are based on hardwood penetration; similar data for softwoods show the maximum at about the same ammonia-water ratio but the change is less sharp at the peak.

FIG. 6 is a plot of tear factor vs. filtration resistance. The numerical value of filtration resistance varies inversely substantially as the numerical value of Canadian Standard Freeness. The constant filtration resistance measurements were carried out according to the procedure and conditions described for wood pulp on page 154 in the following reference: Ingmanson, W. C., and Andrews, B. D. TAPPI, vol. 46, No. 3, pages 150–155, March 1963. A general description of filtration resistance analysis is found in an article by R. P. Whitney, W. C. Ingmanson and S. T. Han in TAPPI, vol. 38, pages 157–166 (1955).

As will be seen from FIG. 6, the tear factor for A, which is a commercial type kraft pulp, is substantially constant over a considerable range of filtration resistance. This is in contrast to pulp B wherein the pulp is the product of a pulping treatment of aspen chips with sodium chlorite; the sodium chlorite was present to the extent of 105% based on the oven dry wood, and the chips were soaked in this aqueous media for a length of time sufficient to reduce the permanganate number to 5.9 at a yield of about 75.2%. It will be noted that this pulp has a tear factor which decreases linearly as the filtration resistance increases. In contrast to each of the previously mentioned pulps, the pulp designated pulp C (see Example 6) exhibits a high tear factor which decreases slowly as filtration resistance increases.

In distinct contrast to the pulps A, B and C, the pulp D exhibits a tear factor which increases as filtration resistance increases. This pulp D is that of Example 7 wherein refining preceded chlorination.

Referring now to FIG. 7, it will be noted that the pulps A and B exhibit good stretch characteristics but that the pulps in accordance with this invention, that is, C and D, as designated in FIG. 7, have a much higher stretch and that such increases quite rapidly as filtration resistance increases in the instance of the pulp which is chlorinated first and then refined (Example 6). Such high stretch is apparently related to the crinkled and curled condition of individual fibers.

In the specific examples which follow, fibrillation is obtained upon refining by appropriate setting of the disc refiner plates.

Example 1

Conventional aspen having a moisture content of about 50% (FIG. 1) based on the weight of the natural wood is provided and chipped in usual commercial manner. The moisture content is such that the wood is dry to the touch—in effect, at normal moisture content. These chips have a normal size of about ½" to ⅝" long and ⅛" to 3/16" thickness. The chips are suitably first subjected to a crushing action in a roll press under a nip pressure of about 1500 p.s.i. This action is not a necessary one but serves to open the chips and to thereby shorten impregnation time. A vertical impregnation chamber is provided and the chips are fed thereto to substantially completely fill the chamber. To the crushed chips in the chamber in the cold (about 70° F.) there is fed liquid ammonia. Nitrogen gas under pressure, for example, of about 200 p.s.i. is used to force the ammonia to the wood in the chamber, and air is vented from the chamber as impregnation proceeds. The ammonia penetrates the interstices of the wood quite readily, apparently being condensed within wood capillaries as well as exerting a distinct vapor pressure. The impregnation procedure is generally conventional and may be varied in known manner to accommodate to particular equipment.

The particular chamber employed herein was provided with a hot water jacket and hot water at a temperature of about 235° F. was fed to the jacket. In the equipment employed after venting of the air, completion of the ammonia feed and sealing of the chamber, about 15 minutes was required to bring the contents of the chamber to a temperature of about 230° F. by means of the hot water jacket. Heating increased the chamber pressure to 500 to 570 p.s.i. gauge which further facilitated impregnation. The chamber contents were held at this temperature and pressure condition for an additional 15 minutes to insure of complete impregnation and wood plasticization. The ammonia was present in the chamber to the extent of about 2.5 times the weight of water in the wood (2.5 pounds per pound of oven dry wood) and, accordingly, the developed pressure was preponderantly due to the ammonia. The exact amount of ammonia is not critical if a sufficient amount, relative to the water content of the system, is employed to insure of the plasticizing and pressure developemnt without the presence of excess free liquid; that is, in the process there is no suspending liquid of significance, the ammonia and water being retained by the chips. During the impregnation and while the wood is heated, some ammonolysis, including neutralization of carboxyl groups and cleavage of acetyl groups, may occur but the development of water solubles is desirably limited and is achieved by limiting the water content of the system.

By opening the chamber quickly after impregnation through the medium of an air cylinder controlling a bottom closure of the chamber or the like, the pressure on the wood chips is rapidly released. For this purpose a relatively restricted outlet of the chamber about ½" in diameter is employed. By opening this outlet to a relatively low pressure and temperature zone, ejection of the impregnated chips occurs. This permits the ammonia to blast to an expanded state, exploding the wood, disrupting it and providing a fibrous product with evolution of volatiles, particularly the ammonia. Suitably, the chamber has associated with it a screen which receives the fibers blasted out from the chips and the ammonia largely escapes as it performs the rough fiberization. The exploding material may be directed to a target plate, if desired, but such is not necessary. Due to ammonia expansion heat is withdrawn from the fibrous material and it cools quickly. This cooling effect varies with several factors but is commonly sufficient that the vapor pressure of water is not high at the chip temperature and water in significant amount remains with the chips. However, the severe color reversion commonly associated with the presence of aqueous bases does not occur upon explosion if the water content is maintained reasonably low in the conduct of the process.

The pressure under which the ejection and wood defibration by explosion takes place is largely due to the ammonia; no nitrogen pressure or the like is required for ejection though such may be employed as a supplement. The fiberizing action which takes place, however, is considered to be due in large measure to the rapid expansion of the ammonia upon the passage of the wood chips to the zone of lower pressure. Such latter mentioned pressure is suitably atmospheric for convenience and the temperature of the zone is commonly ambient; as is understood in the art, the pressure difference between the chamber and the exterior is the important factor rather than the specific pressures insofar as the explosive factor is concerned.

The product of the explosion is a substantially dry course fibrous mass and, when using the aspen wood, is generally a light tan in color and composed largely of fiber bundles with some individual fibers but no significant fines. The fibers are, in effect, whole wood fibers of a modified physical character and more pliable and flexible than whole wood fibers produced by mechanical or steaming procedures. Generally, an increased water content of the fibrous product causes greater darkening of the fibrous material. The yield (oven dry weight) based on the wood weight (OD) fed to the chamber is very high, approximately 100% as it issues from the chamber. The yield after washing with water in the present instance was about 90%. The constituents removed in washing include the water solubles of the natural wood and a content of amides, particularly acetamide. Vanillic acid and p-hydroxy benzoic acid were also present; the acetamide constituted about one-half of the solubles. Such constituents may be recovered. It is to be noted that the product of the explosion does not involve any significant liquids for disposal and the procedure is thus a factor in eliminating the production of possible pollutants.

Not only is the yield high but there is substantially no damage to fiber length; preservation of fiber length with the hardwoods is an extremely beneficial factor when coupled with ease of subsequent mechanical or chemical treatment in fiberizing actions as the preservation of the fiber length is a material characteristic in the production of strong paper sheets—up to about 8 to 10 times the strength contribution of a stone groundwood.

Importantly also, however, the washed product contains substantially all of the hemicelluloses of the original wood in water insoluble form. Such is desirable as the hemicelluloses are retained in subsequent processing and largely provide for the bonding capability of the fibers between themselves in sheet manufacture and the like.

In all probability there is an ammonolysis of the cellulose to some degree. This is, however, not of particular significance to the lignocellulosic fibers directed to uses in accordance with the invention. However, it is important to note that the procedure apparently prevents or inhibits the development of water soluble material to a very large degree, some solubles (in addition to those naturally present) being developed as the percentage of water in the system increases. Such increase commonly is due to the varying natural moisture content of the wood as water addition to secure the exploded fibrous material is not necessary. Also, it is to be noted that the solubles are low even though the time of treatment from impregnation to explosion was very much greater than in steam explosion procedures. In general, an ammonia to water ratio by weight of 2:1 to 4:1 for the system is quite suitable.

The coarse dry fibrous product of the explosion is well broken down from the raw wood state and the bundles of fibers may be separated by a very gentle mechanical action to provide a material of 600 to 700 CSF. This material is significantly changed in character from the wood state and is useful alone (by pressing and heating) in the manufacture of insulating board and suitably in combination with binding resins in hardboard manufacture after washing out of the solubles. Importantly, the fibrous material has characteristics which adapt it for mechanical and chemical pulping as already noted.

Example 2

Example 1 was repeated utilizing a plurality of different woods at their natural moisture content. The woods included the hardwoods—beech, birch, gum, oak tupelo, hickory and maple; the softwoods included spruce and southern pine. The yields after washing ranged from above 89% to about 93.6%, averaging about 90%, and other factors were substantially in accordance with FIG. 1. The softwood fibers, however, which commonly are of longer length than the fibers of the hardwoods, do not show fiber length retention to the same degree as the hardwoods. Accordingly, while strength improvements are attained, they are not as great as in the case of the hardwoods.

Example 3

Example 1 was repeated using a plurality of woods including those of Example 2 but with a lower wood moisture content. The wood in each instance was air dried and the moisture content was about 10% based on the oven dry weight of the wood. The ammonia to water ratio varied for the woods but was high, between about 20:1 to 32:1; in general, as the ratio increased, the yields were somewhat greater. The results generally, however, were as previously discussed except that the woods usually were lighter in color, and the yields after washing were significantly higher (91 to 98.6%) averaging 95% and less water solubles were formed as the yield figures indicate. In the process somewhat higher chamber pressures were obtained for the same quantity input of anhydrous ammonia (800 to 900 p.s.i. vs. 500–600 with the greater water contents).

Example 4

The exploded aspen wood product of Example 1 is washed and passed twice through a refiner with a mild rubbing action to thin out the fibers and fiber bundles. This action, while not necessary to the pulping action, has been found to materially aid fiber length retention upon refining to low freenesses. The thinning action is carried out with the refiner plates open to simply effect separation of the fiber bundles into fibers and very small fiber aggregates. The separated material (CSF 600–700) is then passed through a Sprout Waldron disc refiner to refine the stock to a freeness of 170; the material is then further refined to a CSF of 148. This freeness is measured after screening or centrifugal cleaning the twice refined material. About 61 H.P. days per ton were required to reduce the exploded, washed material to the freeness of 148. The rejects were about 7% and these were recycled. The improved plasticity of the exploded fibers, due probably to the hemicellulose content and probably also due to the decreased crystallinity and lower condensation of the lignin relative to steam exploded fibers, for example, provides improved refining action without significant fiber breakage. The crinkled, curled and twisted nature of the exploded fibers may also facilitate the refining action. A screen analysis of the material of the 148 CSF material is as follows:

| Mesh: | Percent |
| --- | --- |
| 28 | 7.4 |
| 48 | 45.4 |
| 100 | 18.8 |
| 200 | 6.8 |
| −200 | 21.6 |

Such fractionation data indicate that there are a materially greater proportion of fibers in the higher range (48 mesh screen) and a considerably fewer fibers which pass the 200 mesh screen as compared with stone groundwood. Hand sheets were made by a standard procedure from the pulp of 148 CSF. These hand sheets had a basis weight of 44.2 lbs. per ream (25 x 40 x 500). The sheet size was 7½" x 7½" x .00455 thickness. Such hand sheets exhibited the following characteristics:

| | |
| --- | --- |
| Tear factor | 56.8 |
| Burst factor | 24.6 |
| Breaking length in meters | 4320 |
| Stretch in percent | 2.3 |
| T.E.A. (tensile energy absorbed) | 4.47 |
| Brightness (G.E.) | 37 |
| Scattering coefficient | .06 |
| Absorption coefficient with white light | .015 |

The physical properties are generally superior to those of a groundwood; for some purposes the scattering coefficient may be low and may usually be augmented by relatively inexpensive fillers.

Example 5

Example 4 was repeated but employing air dry aspen wood in which the ratio of water to wood (oven dry basis) was .073 and the ammonia to water ratio was about 34:1. This lesser quantity of water utilizing the same ammonia content resulted in a higher pressure of about 860–880 pounds per square inch absolute in the bomb chamber. The product of the explosion process was similar to that described in conncetion with Examples 1 and 4, except that the color of the fiber was somewhat lighter, yields averaged about 5% higher, and the work required to refine to a given freeness was somewhat reduced relative to that set out in Example 4. The material as a pulp is useful in wrappings, corrugating media and the like.

Example 6

In my procedure now to be described, features are that a high yield delignified pulp is attainable with excellent fiber length in an efficient rapid process utilizing 20–30% chlorine consumed based on the weight of the oven dry wood. I have described the pulping with chlorine herein in detail as the successful pulping of wood with chlorine is consider to be a novel procedure although chlorine has been employed as a bleaching agent for many years. Apparently the nature of the exploded fibers contributes to the success of the chlorine action. Other chemical pulping procedures such as the kraft or sulfite may be likewise employed at reduced times, temperatures and material savings.

The exploded fiber of Example 1, using aspen of a natural water content of about 50%, after explosion, was washed with a dilute aqueous sulfur dioxide solution to neutralize any ammonia not volatilized and remaining in the wood. This procedure would not commonly be necessary but is desirable where there is a time lag between the wood explosion procedure and further chemical treatment. The reason is that ammonia in the presence of water tends to darken the wood if ammonia is permitted to remain in contact with wood having a water content over any material period of time; frequently, some traces of ammonia remain with the fibrous mat after ammonia has exploded the wood, and the slight acid treatment effectively eleminates this condition.

Following the washing action the wood pulp is mechanically separated and defibered in the wet condition and very lightly simply to break up the bundles. After this procedure, the pulp has a Canadian freeness of about 600.

The well exposed fiber is now (FIG. 3) chlorinated by immersion in an aqueous solution of chlorine, the chlorine content being 15% by weight based on the weight of oven dry exploded fiber. A pulp consistency of about 2½–3% is employed in this chlorine treatment, and the action takes place at room temperature for a period of between about 30–60 minutes. This time period is not critical and may be much shorter as it does appear from repeated experiments that the chlorine itself is completely consumed within about 5 minutes. While the time employed herein was longer than necessary, the pulp did not appear to be harmed by the treatment. However, shorter times are generally beneficial in that, as time increases, there is a tendency for hydrochloric acid liberated in the chlorination process to hydrolyze wood polysaccharides, leading to decreased yield and inferior pulp properties. One of the most important factors distinguishing the exploded fiber is that it may be chlorinated in short times to provide maximum delignification with minimum attack on the polysaccharides. Such is shown by the high yield and good strength properties of the pulp.

Following chlorination, the pulp is filtered to eliminate water solubles. It is then washed in water and treated with an aqueous sodium hydroxide solution at a temperature of about 70° C. for one hour or less. The sodium hydroxide solution is of such a strength as to be equivalent to 50% of the chlorine solution employed and serves to extract the chlorinated lignin fractions and, to some extent, to cause the pulp to become swollen and more exposed.

Following the alkaline treatment, the pulp is again filtered, washed with water and rechlorinated. This rechlorination step is carried out in an aqueous solution (15% based on oven dry pulp weight), and the rechlorination proceeds at room temperature for about a half hour.

These chlorination and rechlorination actions may also be carried out in an atmosphere of chlorine gas with good effect if so desired.

Following rechlorination, the pulp is again washed and then treated with caustic for a half hour at 70° C. to eliminate substantially all chlorine solubles and chlorine. The pulp is then dried and the yield on an oven dry basis, based on the exploded fiber, is about 72.4%. The permanganate number of this pulp was 2.3, the CSF about 300 and the G.E. brightness about 60.

Samples of this pulp were bleached to a brightness of 83 G.E. by employing a 1% peroxide aqueous solution, the pulp consistency during bleaching being about 10%. There is substantially no decrease in yield with such bleaching action. (A brightness of 80–85 is also obtained by using a ½ % chlorine dioxide solution at a consistency of about 10%.) As indicated by the low permanganate number, the pulp is considered an easy bleaching pulp.

A plurality of samples of this pulp were then refined to different freenesses, and hand sheets made and physical data taken. Such data serve as a basis for the curves of FIG. 6 and FIG. 7. As is readily noted from these figures, a tear factor of above 80 and a percent stretch of 4 or more at conventional freenesses is readily attained.

It should be noted that the yield of the chlorinated pulp is high, that is, 60–65%, vs. 45 to 55% for kraft at about the same permanganate number. This is because the pulp in the kraft process suffers a considerable loss of hemicelluloses as well as lignin in the chemical digestion procedure. It is considered that the yield of the chlorinated pulp may be even further slightly improved by carrying out the extractions with ammonium hydroxide rather than the stronger base sodium hydroxide.

The paper sheets produced from the chlorinated refined pulp have a higher burst at a lower pulp freeness because the fiber length is well retained and the fibers contain the hemicelluloses. The tear value (FIG. 6) is high for the same reasons. Surface area and specific volume are opposite to what might normally be expected based on other data, being somewhat lower. This factor is not presently explained but may be due to the tendency of the fibers of the explosion procedure to contract and become densified upon ammonia evaporation. The stretch characteristic (FIG. 7) also is greater than is obtained from conventional pulps such as pulps delignified by the kraft process cook or by treatment with chlorine dioxide.

In addition to conventional high quality paper, the delignified product is useful, like other high quality pulps, in the production of wadding, tissue and the like.

Example 7

In the procedure of Example 6 the exploded fibrous material of about 600 CSF was first chlorinated and then refined (FIG. 3). By practicing the reverse procedure (FIG. 4) of refining to freeness and then chlorination, it is found that certain advantages are obtained for particular purposes. The fibers of about 600 CSF, when refined to about 300 CSF and chlorinated as in the preceding example, are substantially like those of Example 6 but somewhat more stiff. Importantly, however, it is found that for the fibers of this example as the filtration resistance increases in value (FIG. 6) or as freeness value (CSF) falls, the tear values increase. Filtration resistance values, as already noted, correspond inversely generally to freeness values but are a somewhat more sensitive and meaningful measure of changes upon refining than is freeness (CSF). Such high tear factor provides improved machine runnability of the paper at high machine speed.

Example 8

In the procedure of Example 1 the anhydrous ammonia was directed to the chips as an impregnant liquid. An external heat source, that is, a surrounding hot water jacket, was employed to raise the temperature of the chips and the ammonia to effect plasticizing of the chips. A more time saving process is attained if the ammonia is supplied as a gas or vapor in a heated condition so that the heating of the impregnated chips in an explosion chamber is by contact of the ammonia with the chips.

In specific application conventional freshly chipped aspen wood having a moisture content of about 50% based on the weight of the natural wood was in the chip form directed to a vertical impregnation chamber. The ammonia liquid was heated in an adjacent partially filled vessel to a temperature of about 250° F., that is, above the critical temperature of the ammonia. The chip-containing impregnation chamber was connected through an open valve in a pipe line to the upper interior zone of the ammonia carrying vessel, and the heated ammonia was introduced to the impregnation chamber under pressure. Upon closing of the valve, in the piping between the vessel and the otherwise closed impregnation chamber, the pressure within the impregnation chamber was about 1000 p.s.i. and the chips heated by the gas were impregnated and plasticized. The pressure within the chamber was attained within 5 to 10 seconds of heated ammonia flow; the chips were subjected to the penetration by the ammonia for approximately one minute following valve closing, and then the chamber was opened quickly to the atmosphere to cause ejection of the wood, the ammonia blasting to an expanded state and disrupting the wood to fibers and fiber bundles. This defiberized material was washed, as previously described in connection with the product of Example 1, with a dilute aqueous sulfur dioxide solution and the yield based on the weight of oven dry wood was about 90–95%. The wood fiber coloration was somewhat lighter than the product of Example 1 and had the characteristic kinked and curled feature. The exploded fibrous product was then refined to a Canadian Standard Freeness of about 300 and hand sheets were prepared as described in Example 4. The fibers were pliable and responded well to the refining action. The General Electric brightness, without bleaching, was about 57 and the shive content slightly greater than in the product of Example 1. Bleaching with peroxide at levels of 1, 2 and 3% on the weight of oven dry fiber raised the G.E. brightness, without significant loss in yield to 66, 70 and 73.7, respectively.

These improved brightness conditions provide the refined pulp within the brightness range commonly desired for newsprint production, groundwood containing merchantable grades, coated web offset papers and the like.

Example 9

Example 8 was repeated except that the time for subjection of the chips to the heated ammonia following valve closure was about 10 seconds. The results attained indicated a somewhat greater shive content and a G.E. brightness without bleaching of about 60.9. Following the same bleaching procedure of Example 8, brightness of 70.7, 75 and 77.6 were attained.

Example 10

I have found that it is desirable and particularly with the shorter impregnation and heating times to employ freshly chipped wood as in Examples 8 and 9. Apparently wood aging in chip form leads to a somewhat less bright product.

Chips from storage were heated, impregnated, exploded and washed as in Examples 8 and 9. The chips were subjected to the heated ammonia for one minute following valve closure. The exploded product was subjected to a light fiber separation action to provide a Canadian Standard Freeness of about 600. The brightness data showed the exploded material to have a brightness of about 35.8 G.E. and this was raised to about 56 by treatment with a 3% peroxide based on oven dry fiber weight. Following bleaching, this pulp after beating to Canadian Standard Freeness of about 390, exhibited the following characteristics:

| Mesh: | Percent |
| --- | --- |
| +28 | 19.3 |
| +48 | 47.9 |
| +100 | 21.3 |
| +200 | 7.2 |
| −200 | 4.3 |

No significant loss in yield occurred on bleaching. Other characteristics were:

| | |
| --- | --- |
| Burst factor | 25 |
| Fold | 18 |
| Tear factor | 45 |
| Opacity | 78.0 |
| Tensile (breaking length in meters) | 5142 |
| Percent stretch | 1.47 |
| Tensile energy absorption | 3.02 |

The explosive action in Examples 8, 9 and 10, as in the preceding examples, results in a well exposed fiber, unfibrillated, capable of being refined without significant fiber breakage and having a fiber length distribution as determined by fractionation data which is substantially that of the original aspen wood. The softwoods suffer somewhat as to fiber breakage but not sufficiently so that the strength properties of the sheets formed from them would be materially poorer than a kraft pulp. In this connection it is to be noted that a primary distinction between the hardwoods and softwoods is the pliability of the exposed exploded fibers. The somewhat higher pressures than were employed in Example 1 tend to require equipment of higher pressure rating but the higher pressures are of assistance in shorter impregnation and heating times and particularly useful where the fiber is to have less deep coloration and the optimum defiberization is not required. Cost factors and the resultant desired pulp characteristics as well as, for example, the nature of the wood material itself influence the selection of specific conditions and equipment.

Investigation has been made of the utility in the explosion process of pin chips or the like to increase penetration rate and to accomplish more specific fiberization upon explosion; conventional chips, however, appear to serve the purpose well and particularly so where a crushing action to aid penetration is followed. Crushing, however, is not necessary and, if employed, care must be taken to avoid fiber damage. Increased pressure for the explosive procedure results in somewhat greater production of individual fibers and less large fiber bundles; at 1800 pounds per sq. in. the product is somewhat better than at 800 pounds per sq. in. However, separating and defibering by lightly rubbing in a defibering action in a refiner is desirable to minimize rejects in subsequent pulping procedures. It is to be noted that the explosion pressures attained in the ammonia explosion process are somewhat higher than equilibrium conditions would suggest and is in contrast to steam explosion procedures. High density chlorination may also be successfully practiced with the exploded pulp. Thus, a substantially completely delignified white pulp of 20% consistency has been produced by chlorination of the washed, exploded material. Non-wood material successfully treated in accordance with the invention has included bagasse, and it is contemplated that the procedure may be usefully employed with other lignocellulosic materials. Also, where desired, the pulp may be subjected to a repeated explosion procedure to attain improved defiberization.

The pulps produced in accordance with the invention then are particularly characterized by high stretch and tear at high yield and high yield relatively speaking, even at very low permanganate numbers. In addition, the fibers of the pulp are flexible, somewhat densified, and have a relatively low water holding capacity; conversely, the fiber material of the explosion process and the mechanical and chemical pulps derived from the exploded material are highly compressible and resiliently so. The chlorinated product crepes well and has wet strength characteristics similar to kraft pulps.

The terms pulp, pulping and the like as used herein and in the appended claims is intended to indicate the fibrous state of the raw material or the reduction to the fibrous state by procedures of chemical cooking, mechanical working, explosion procedures and combinations thereof as is known in the art.

The terms fiberize, defibering and the like are intended to indicate the procedures of reduction of fiber aggregates from sources such as pulp products including those plasticized by the explosion procedure and usually accomplished by disc mills, conical refiners and the like operating to separate rather than to cut fibers.

As many apparently widely different embodiments of this invention may be made without departing from the spirit and scope thereof, it is to be understood that I do not limit myself to the specific embodiments thereof except as defined in the appended claims.

I claim:

1. In a method of manufacturing pulp, the steps of: impregnating a mass of chips of lignocellulose material of a water content of between about 0 and 100% based on the oven dry wight of the lignocellulose material with substantially anhydrous ammonia as a volatile nitrogenous swelling agent for the lignocellulose material so that the ammonia is present to at least about the same extent by weight as the water is present in the system, heating, without added steam, the impregnated chips within a closed space under pressure in the absence of suspending liquid to a temperature sufficient to plasticize the lignocellulose material so that the chips are deformable, and suddenly releasing the pressure on the mass of plasticized deformable chips by opening a relatively restricted outlet from said closed space to a zone of materially lower pressure to cause ejection of the impregnated chips from the space and explosive removal of ammonia with accompanying deformation and disintegration of the chips to a fibrous condition in which the fibers are bleachable, flexible, kinked, twisted and curled, and which enables mechanical and chemical defibration of the exploded material.

2. A method according to claim 1 in which the ammonia to water ratio by weight in the system upon pressure release is between about 1:1 and 32:1, and the lignocellulose material is selected from the group consisting of hardwoods and softwoods.

3. A method according to claim 1 in which the ammonia to water ratio by weight in the system upon explosion is between about 1:1 and 9:1, the temperature to which the mass of chips is raised is between about 200° F.–300° F. and the lignocellulose material is selected from the group consisting of hardwoods and softwoods.

4. A method according to claim 2 in which the pressure upon initiation of pressure release is less than 1000 lbs./sq. in.

5. A method according to claim 1 in which the zone of materially lower pressure is that of substantially atmospheric pressure.

6. A method according to claim 1 which further includes pulping the exploded fibrous material to provide a pulp useful for papermaking.

7. A method according to claim 1 which further includes subjecting the exploded material to a very slight mechanical separating and defibering action to provide a fibrous material of high Canadian Standard Freeness of about 600 and above.

8. The process according to claim 1 which further includes mechanical separating and defibering the exploded fibrous material in a disc refiner action in which the refiner plates are open to limit mechanical working of the fibers and to provide a Canadian Standard Freeness of about 600 and above.

9. A method according to claim 1 which further includes subjecting the exploded fibrous material first to a mechanical separating and defibering action and then pulping with chlorine to delignify the fibers.

10. The process according to claim 1 which further includes subjecting the exploded fibrous material to pulping by chemical means and then subjecting the resultant pulp to a refining action to reduce the Canadian Standard Freeness of the pulp.

11. The process according to claim 1 which includes subjecting the exploded fibrous material to a mechanical separating and defibering action to provide a fibrous material of a Canadian Standard Freeness of about 600 and above, and then chemically pulping and subsequently mechanically refining the fibrous material to further reduce the freeness.

12. The process according to claim 1 which includes first mechanically refining and then chemically delignifying the exploded material.

13. The process according to claim 1 which further includes subjecting the exploded fibrous material to a washing action to remove solubles and recovering acetamide from the solubles.

14. In a method of manufacturing pulp, the steps of: impregnating a mass of chips of lignocellulose material selected from the group consisting of hardwoods and softwoods and of a water content of between 0 and 100% based on the oven dry weight of the lignocellulose material with substantially anhydrous ammonia as a volatile nitrogenous plasticizing and swelling agent for the lignocellulose material so that the ammonia is present to at least about the same extent by weight as the water is present in the system, heating, without added steam, the impregnated chips within a closed space under pressure in the absence of suspending liquid to a temperature sufficient to plasticize the lignocellulose material so that the chips are deformable, and suddenly releasing the pressure on the mass of plasticized deformable chips by opening a relatively restricted outlet from said closed space to a zone of materially lower pressure to cause ejection of the impregnated chips from the space and explosive removal of volatile agent with accompanying deformation and disintegration of the chips to a fibrous condition in which the fibers are pliable, flexible, and of substantially whole wood.

15. In a method of forming a paper sheet from a pulp, the steps of impregnating a mass of chips of lignocellulose material of a water content of between about 0 and 100% based on the oven dry weight of the lignocellulose material with substantially anhydrous ammonia as a volatile nitrogenous swelling agent for the lignocellulose material so that the ammonia is present to at least about the same extent by weight as the water is present in the system, heating, without added steam, the impregnated chips within a closed space under pressure in the absence of suspending liquid to a temperature sufficient to plasticize the lignocellulose material so that the chips are deformable, suddenly releasing the pressure on the mass of plasticized deformable chips by opening a relatively restricted outlet from said closed space to a zone of materially lower pressure to cause ejection of the impregnated chips from the space and explosive removal of ammonia with accompanying deformation and disintegration of the chips to a fibrous material condition in which the fibers are bleachable, flexible, kinked, twisted and curled, washing water solubles from the said curled, kinked fibrous material and then separating and pulping the fibrous material to form a pulp of low freeness, bleaching the pulp, and then forming a paper sheet from said pulp.

16. A method according to claim 15 in which the ammonia to water ratio by weight in the system upon pressure release is between about 2:1 and 4:1, and the temperature to which the mass of chips is raised is between about 200° F. and 300° F.

References Cited
UNITED STATES PATENTS

| | | | |
|---|---|---|---|
| 2,032,437 | 3/1936 | Richter | 162—63 X |
| 2,516,384 | 7/1950 | Hill et al. | 162—100 |
| 3,308,013 | 3/1967 | Bryant | 162—201 X |
| 2,711,369 | 6/1955 | Birdseye | 162—22 |
| 2,964,518 | 12/1960 | Snyder | 162—63 X |
| 3,533,906 | 10/1970 | Reiniger | 162—13 |

OTHER REFERENCES

Casey: Pulp & Paper, vol. I, 1952, p. 205.

Arlov et al.: "Extensibility of Paper Improved by Treatment With Liquid Ammonia," May 1964, pp. 172–180.

S. LEON BASHORE, Primary Examiner

A. L. CORBIN, Assistant Examiner

U.S. Cl. X.R.

162—22, 25, 63, 66